United States Patent
Macyszyn

(10) Patent No.: US 9,883,744 B2
(45) Date of Patent: Feb. 6, 2018

(54) UNIVERSAL STABILIZER DEVICE

(71) Applicant: Witold S. Macyszyn, Sussex, NJ (US)

(72) Inventor: Witold S. Macyszyn, Sussex, NJ (US)

( * ) Notice: Subject to any disclaimer, the term of this patent is extended or adjusted under 35 U.S.C. 154(b) by 0 days.

(21) Appl. No.: 15/097,435

(22) Filed: Apr. 13, 2016

(65) Prior Publication Data

US 2017/0295931 A1 Oct. 19, 2017

(51) Int. Cl.
| | |
|---|---|
| *F16M 11/26* | (2006.01) |
| *A47B 91/16* | (2006.01) |
| *A47B 91/02* | (2006.01) |
| *B62B 5/00* | (2006.01) |
| *E06C 7/42* | (2006.01) |

(52) U.S. Cl.
CPC ............ *A47B 91/16* (2013.01); *A47B 91/02* (2013.01); *F16M 11/26* (2013.01); *B62B 5/00* (2013.01); *B62B 2301/00* (2013.01); *E06C 7/423* (2013.01)

(58) Field of Classification Search
CPC .......... E06C 7/44; E06C 7/423; F16M 11/26; F16M 2200/04; F16M 2200/044; F16M 2200/048; B62L 35/00; A47B 91/16; A47B 91/02; B62B 5/00; B62B 2301/00
USPC .......... 182/202; 248/188.5, 188.3; 403/109.1
See application file for complete search history.

(56) References Cited

U.S. PATENT DOCUMENTS

| | | | |
|---|---|---|---|
| 2,548,311 A | 4/1951 | Johnson | |
| 2,746,822 A * | 5/1956 | Copenhaver | A47B 9/20 248/188.5 |
| 2,775,849 A | 1/1957 | Ingram | |
| 2,854,180 A * | 9/1958 | Brunckhorst | E06C 7/44 182/202 |
| 2,969,126 A * | 1/1961 | Gardner | E06C 7/44 182/202 |
| 2,975,468 A | 3/1961 | McClellan | |
| 3,102,606 A | 9/1963 | Hopfeld | |
| 4,095,671 A * | 6/1978 | Forristall | E06C 7/44 182/202 |
| 5,490,648 A | 2/1996 | Cullen | |
| 5,690,191 A | 11/1997 | Burbank | |
| 5,690,303 A | 11/1997 | Winters | |
| 6,681,908 B2 * | 1/2004 | Davis | F16F 1/12 188/380 |
| 6,877,773 B1 | 4/2005 | Bibb et al. | |
| 6,955,396 B2 | 10/2005 | Moon et al. | |
| 7,546,730 B2 | 6/2009 | Kubinski | |
| 7,748,723 B2 | 7/2010 | Iturbide Jimenez | |
| 8,651,441 B2 | 2/2014 | Brooke | |
| 2004/0178306 A1 | 9/2004 | Hallberg | |
| 2004/0227314 A1 | 11/2004 | Black | |

(Continued)

*Primary Examiner* — Christopher Garft

(74) *Attorney, Agent, or Firm* — Richard L Miller

(57) ABSTRACT

A self stabilizing system which has an incompressible coil at least partially encompassed in a housing, and which controls a foot of a device to be stabilized. The coil abuts a plunger, which plunger is for allowing a user to selectably lock the elevation by use of a pin which fits within a plurality of annular grooves on the plunger. In a first embodiment, a pair of coils surround the plunger on either side and control a pair of feet, thus allowing automatic stabilization on an uneven surface. In a second embodiment, a single coil is controlled by a spring which abuts the plunger allowing a spring-loaded system for selecting an elevation to lock the plunger.

9 Claims, 9 Drawing Sheets

(56) References Cited

U.S. PATENT DOCUMENTS

2009/0039216 A1    2/2009   Kwon et al.
2012/0187651 A1    7/2012   Wimmer

* cited by examiner

UNIVERSAL STABILIZER DEVICE

BACKGROUND OF THE INVENTION

Field of the Invention

The present invention relates to a stabilizing system, and more particularly, a UNIVERSAL STABILIZER DEVICE.

Description of the Prior Art

Numerous innovations for stabilizers have been provided in the prior art that will be described. Even though these innovations may be suitable for the specific individual purposes to which they address, however, they differ from the present invention.

A FIRST EXAMPLE, U.S. Pat. No. 2,975,468, Published/Issued on Mar. 21, 1961, to McClellan teaches an improvement in a table with retractable casters. More particularly, it deals with such a table in which automatic leveling means are located at each caster or at the end of each leg of the table to support the table when the casters are retracted. The table of this invention finds use for example, as a typewriter table or stand which will rest level and steady on an uneven floor when the table is being used, and may be readily raised on to its casters and rolled out of the way when not in use.

A SECOND EXAMPLE, U.S. Pat. No. 5,690,191, Published/Issued on Nov. 25, 1997, to Burbank teaches a new wheelbarrow braking system for facilitating braking of a conventional wheelbarrow while transporting heavy loads thereby retaining the desired position of the wheelbarrow on uneven surfaces and reducing velocity when transporting down hill. The inventive device includes at least one brake disc secured to the inside surface of a support member of a conventional wheel barrow near the tire rim, and an ergonomic handle support member of a conventional wheel barrow near the tire rim, and an ergonomic handle connected to a brake cable secured to the opposite end of the support member and mechanically connected to the brake disc.

A THIRD EXAMPLE, U.S. Pat. No. 5,690,303, Published/Issued on Nov. 25, 1997, to Winters teaches a base for supporting an object such as a cafe table and the like on uneven flooring includes a central support to which are attached two leg assemblies, one rigidly attached and one rotatably attached to opposing faces on the central support. The rotatable leg assembly includes a bolt through an elongaged hole in the leg assembly and a hole through the face of the central support that allow some rotation but limit excessive rotation. Each leg assembly is composed of two angled legs interconnected by a section that is substantially planar so as to complement the face formed on the central support. A frictional pad between the central support and the leg assembly is used to resist rotation of the central support with respect to the rotating leg.

A FOURTH EXAMPLE, U.S. Pat. No. 6,877,773, Published/Issued on Apr. 12, 2005, to Bibb, et al. teaches automatic and simultaneous retraction of a pair of stabilizer legs for a backhoe loader machine is beneficial for the operator (not shown). Instead of retracting the stabilizer legs by manually holding a pair of control levers continuously in a retract position, the operator (not shown) may simply move the control levers to an auto-retract position. The movement of the control levers in such a manner activates a control switch in connection with each of the control levers. The control switches, in turn, activate a timer relay that activates a solenoid detent operative with each control lever. Once the solenoid detents are in an activated state, the operator (not shown) may relinquish contact with the control levers. The solenoid detents will retain the control levers in the auto-retract position via electro-magnetic forces. The timer relay controls the solenoid detents so that the control levers are retained in the auto-retract position for a preselected time to fully retract the stabilizer legs from any one of a plurality of extended positions.

A FIFTH EXAMPLE, U.S. Pat. No. 6,955,396, Published/Issued on Oct. 18, 2005, to Moon, et al. teaches a self stabilizing and shock absorbing support structure for a collapsible picnic table having integral benches. The support structure includes U-shaped members resiliently attached to each other in a coplanar arrangement which allows the supports to flex and stabilize independently. This arrangement also allows the support structure to absorb shock which would normally be transferred across the table from one bench seat to the other.

A SIXTH EXAMPLE, U.S. Pat. No. 7,546,730, Published/Issued on Jun. 16, 2009, to Kubinski teaches a stabilizer system and method that can provide high speed, relatively low force extension and retraction of a stabilizer leg during a first portion of a stroke, and low speed, relatively high force extension and retraction during a second portion of the stroke. Accordingly, the stabilizer system and method takes less time to deploy than conventional stabilizer systems but without sacrificing performance.

A SEVENTH EXAMPLE, U.S. Pat. No. 7,748,723, Published/Issued on Jul. 6, 2010, to Iturbide Jimenez teaches a device for stabilizing and supporting wheelbarrows which maintains the balance and increases the resistance of a system (wheelbarrow) including an angled monolithic body which is made up of two arms which define a triangular shape, whose ends have holes for the insertion of affixing means to affix to the leg of a wheelbarrow. In one embodiment, one of said arms makes up an arched area along most of its length which generates two points of support, a first point of support defined on the end of the joint affixing with the leg of the wheelbarrow and a second point of support defined in the area near where the two arms meet to define that angle. The arched area of the arm, positioned substantially horizontally and defining the two points of support, absorbs deformation, and also absorbs the load applied to the element, bringing more stability to the wheelbarrow on flat or irregular surfaces, providing a stabilizer comprised by each leg.

AN EIGHTH EXAMPLE, U.S. Pat. No. 8,651,441, Published/Issued on Feb. 18, 2014, to Brooke teaches a support assembly for an item of furniture has an elongated support structure with a first pair of feet fast with the support structure at its lower end; a passage defining arrangement defining a guide passage fast with the support structure and extending lengthwise; a support member displaceable with respect to the support structure which has a second pair of feet at its lower end; an elongated a guided pin fast with the displaceable support member that is complementary to and longitudinally slidably engaged with the passage defining arrangement, so that the displaceable support member is slidably displaceable along a rectilinear guide path which is transverse to lines drawn between both the pairs of feet, the passage defining arrangement comprising a hollow carrier with a pair of longitudinally spaced precision washers which engage the guided pin, the dimensions of the washers and the guided pin being such that automatic frictional engagement of the guided pin occurs, in use, with inner walls of the washers in response to pivoting of the displaceable support member about a pivot axis which is transverse to the displaceable support member's guide path, automatically to anchor the displaceable support member frictionally against sliding displacement relative to the support structure.

A NINTH EXAMPLE, U.S. Patent Office Document No. 20040178306, Published/Issued on Sep. 16, 2004, to Hallberg teaches a self-stabilizing telescopic leg assembly for use in supporting a portion of a platform assembly above a floor surface. The telescopic leg assembly has at least one first leg portion slidably engaging at least one second leg portion. The leg assembly also has at least one pin adapted to simultaneously engage a hole passing laterally through the first leg portion and an angled slot passing laterally through the second leg portion, wherein when the leg assembly is in a vertical orientation, the pin transfers a vertical load from the first leg portion to the second leg portion and causes engagement between the first and second leg portions in a direction at an angle to the vertical orientation of the leg portions.

A TENTH EXAMPLE, U.S. Patent Office Document No. 20040227314, Published/Issued on Nov. 18, 2004, to Black teaches a tilting mechanism incorporated into a conventional wheelbarrow, the wheelbarrow including a bucket portion, a pair of elongated handles supporting the bucket portion, and a front wheel. The tilting mechanism includes a frame adapted to being secured to a rearwardly extending location of the elongated handles and such that the bucket portion is disposed between the frame and the front wheel. A pair of elongated supports are incorporated into the frame and, in combination with the front wheel, support the wheelbarrow upon a surface. The frame includes structure for establishing an angle or incline, relative to an uneven or peaked surface, and is actuated to facilitate tilting of the bucket portion about a longitudinal axis extending through the wheelbarrow.

It is apparent now that numerous innovations for stabilizers have been provided in the prior art that adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a UNIVERSAL STABILIZER DEVICE that avoids the disadvantages of the prior art.

ANOTHER OBJECT of the present invention is to provide a UNIVERSAL STABILIZER DEVICE that is simple and inexpensive to manufacture.

STILL ANOTHER OBJECT of the present invention is to provide a UNIVERSAL STABILIZER DEVICE that is simple to use.

BRIEFLY STATED, STILL YET ANOTHER OBJECT of the present invention is to provide a UNIVERSAL STABILIZER DEVICE that stabilizes a foot in a selectable and lockable position.

More particularly, it deals with such a device in which automatic leveling mechanism are located at each end of each leg of the device to support the device in a level position. The device of this invention finds use for examples, as a table, wheelbarrow, chair or ladder which will rest level and steady on an uneven floor when the device is being used, and may be readily leveled on its legs by a user as required or desired.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows.

A MARSHALING OF REFERENCE NUMERALS UTILIZED IN THE DRAWING

Figure 1:
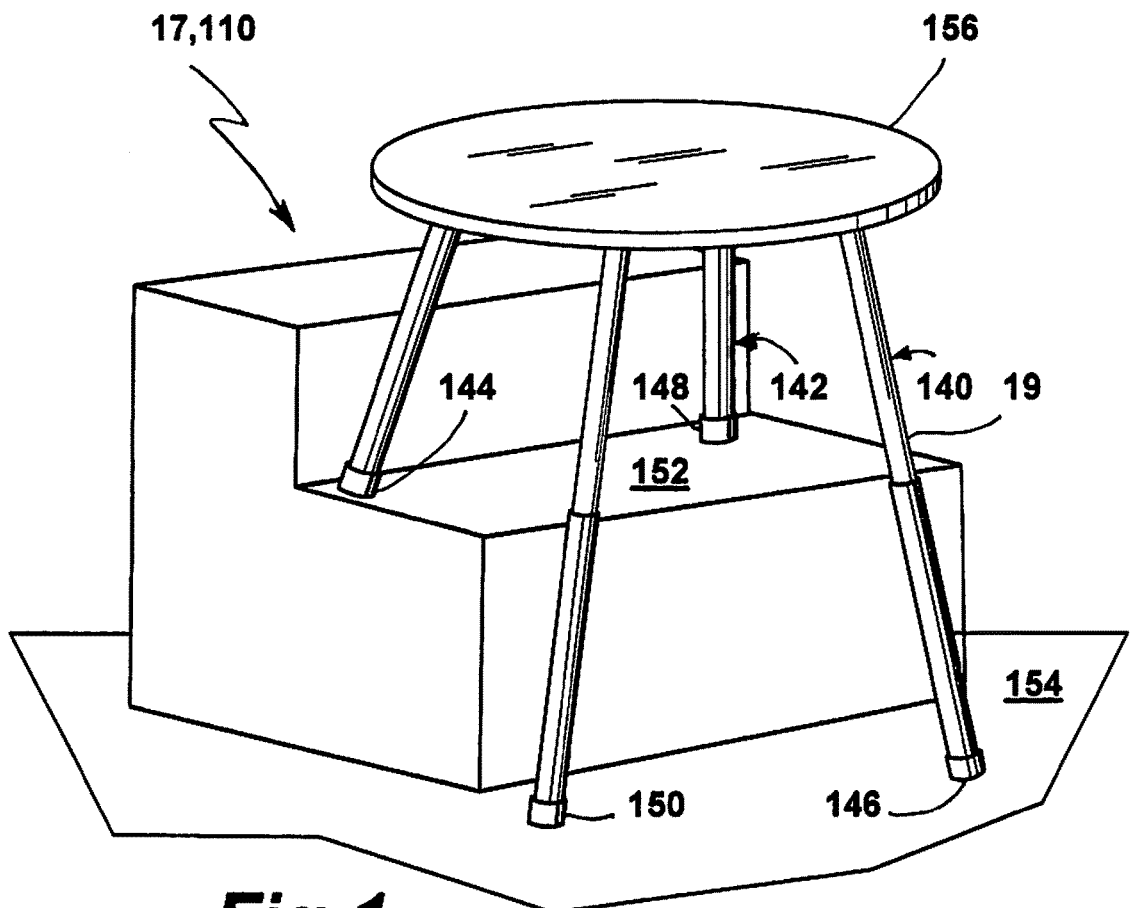
FIG. 1 is a diagrammatic view illustrating a first embodiment of the invention being utilized with a table standing on an uneven surface.
Figure 2:
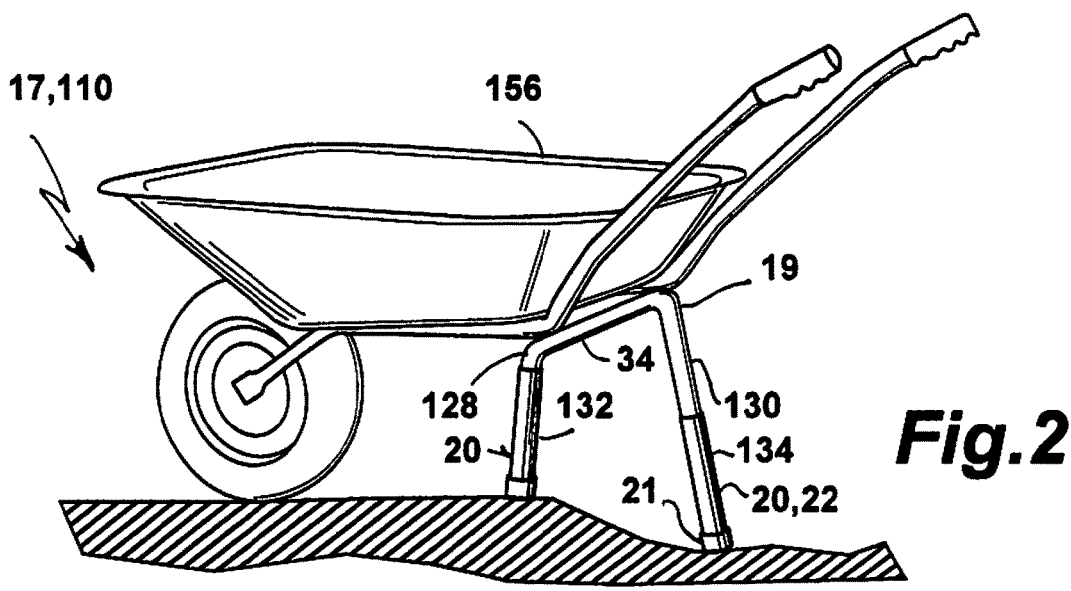
FIG. 2 is a diagrammatic view illustrating a first embodiment of the invention being utilized with a wheelbarrow standing on an uneven surface.
Figure 3:
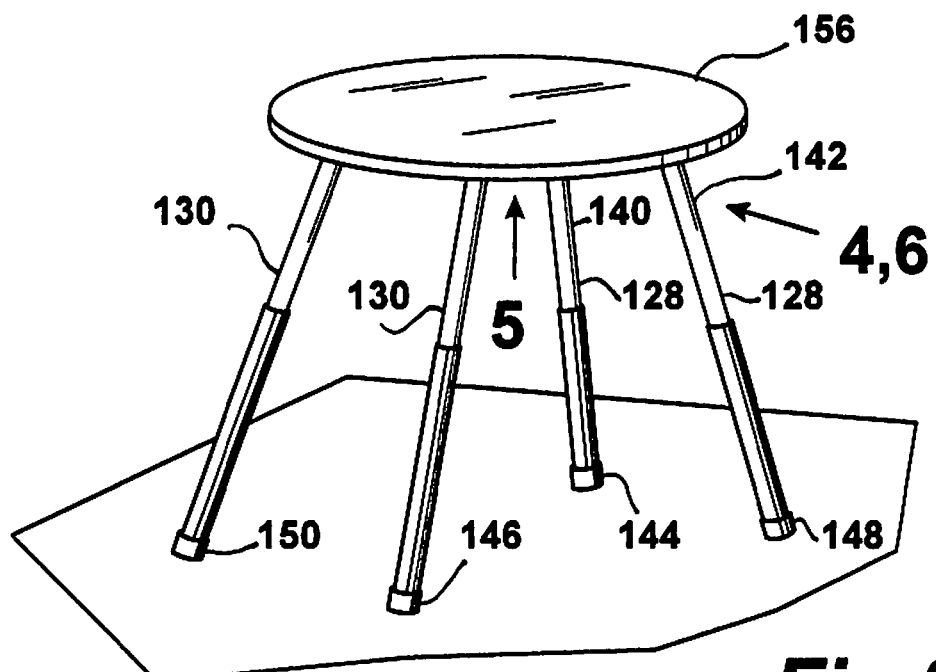
FIG. 3 is a diagrammatic view illustrating a first embodiment of the invention installed on a table per se.
Figure 4:
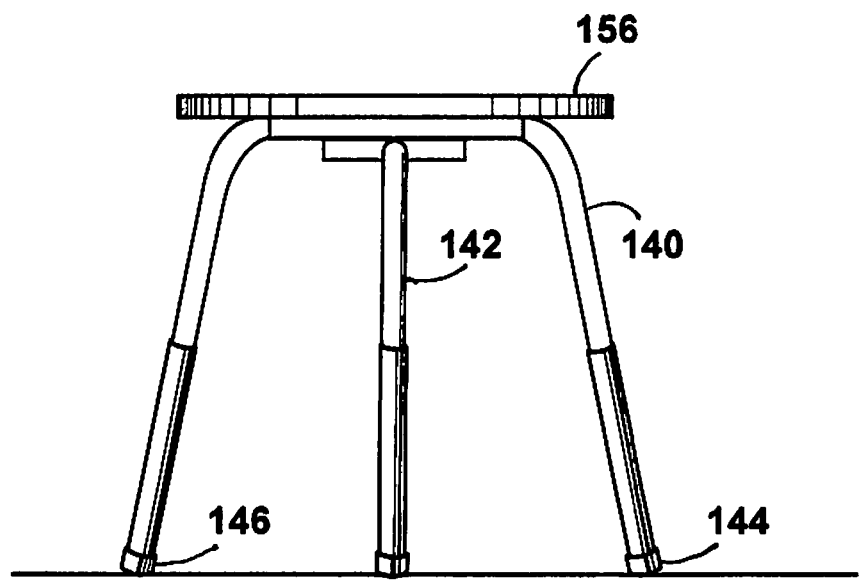
FIG. 4 is a side elevational view thereof, of the table taken in the direction of arrow 4 in FIG. 3.
Figure 5:
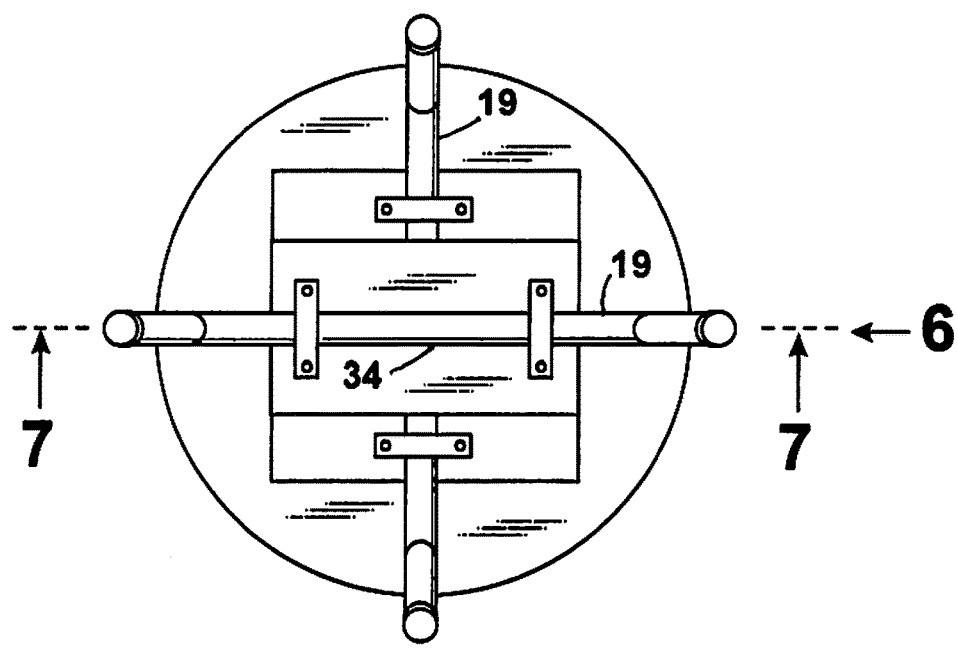
FIG. 5 is a bottom plan view thereof, of the table taken in the direction of arrow 5 in FIG. 3.
Figure 6:
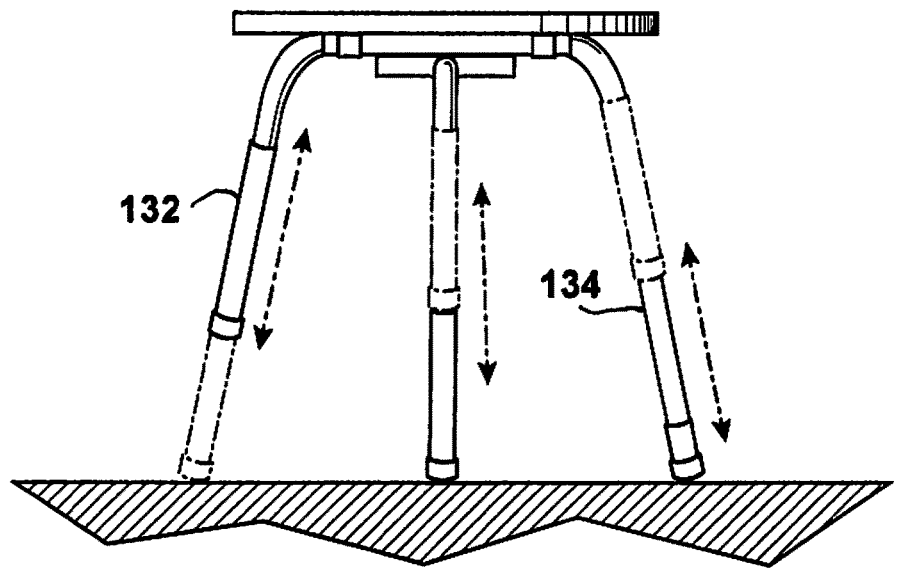
FIG. 6 is a side elevational view thereof, of the table taken in the direction of arrows 6 in FIGS. 3 and 5.

Reference numerals of elements common to all embodiments:
17 universal stabilizer device
18 coil
19 housing
20 sleeve
21 foot of sleeve 20
22 collar of sleeve 20
23 proximal end of coil 18
24 distal end of coil 18
25 plunger
26 annular groove of plunger 25
28 plurality of holes of housing 19
30 pin
32 legs of pin 30

34 straight portion of housing 19
36 rod
38 threads of rod 36
40 threading of coil 18 onto threads 38 of rod 36
Reference numerals of first embodiment 110:
110 first embodiment of a universal stabilizer device 17
111 first coil
112 second coil
114 proximal end of first coil 111
115 distal end of first coil 111
116 proximal end of second coil 112
117 distal end of second coil 112
118 first sleeve
120 second sleeve
122 plunger
124 first end of plunger 122
126 second end of plunger 122
128 first leg of housing 19
130 second leg of housing 19
132 collar of first sleeve 118
134 collar of second sleeve 120
136 first stop
138 second stop
140 first stabilizer
142 second stabilizer
144 first foot of first stabilizer 140
146 second foot of first stabilizer 140
148 first foot of second stabilizer 142
150 second foot of second stabilizer 150
152 first elevation
154 second elevation
156 object connected to device 10
Reference numerals of second embodiment 210:
210 second embodiment of a universal stabilizer device 17
211 plunger
212 proximal end of plunger
213 distal end of plunger
214 cap of housing 19
216 end of housing 19
218 spring
220 bore of plunger 211

DETAILED DESCRIPTION OF THE
PREFERRED EMBODIMENT

Two embodiments of the present invention are disclosed. The first embodiment 110 is disclosed in drawing FIGS. 1-8. The second embodiment 210 is disclosed in drawing FIGS. 9-16. A number of elements are common to both embodiments. This description will begin with those elements common to both embodiments, then discuss the first embodiment 110 and second embodiment 210 in their particulars.

Description of Elements Common to Both Embodiments

Figure 7:
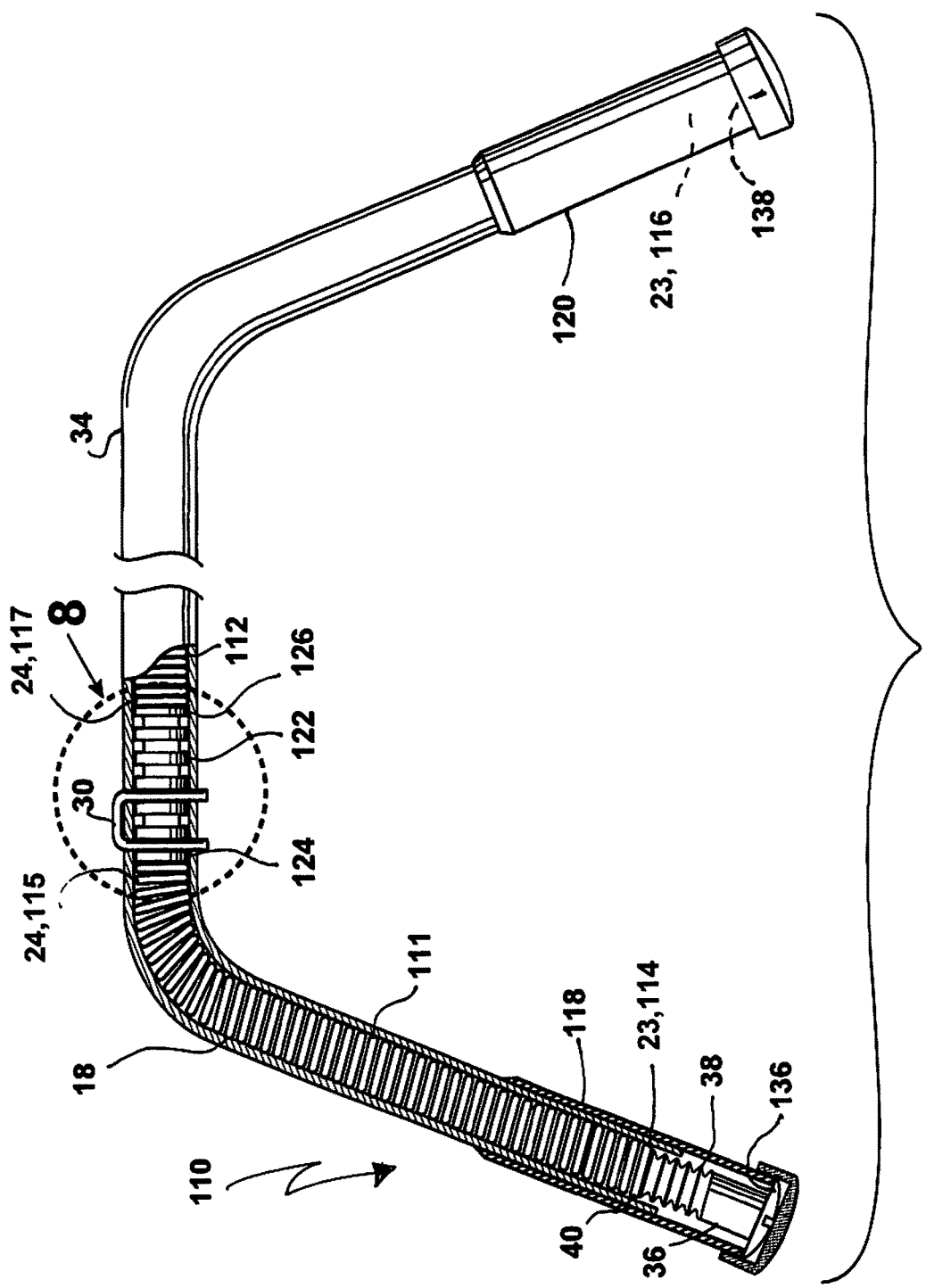
FIG. 7 is a partial cross sectional view taken on line 7-7 in FIG. 6.
Figure 12:
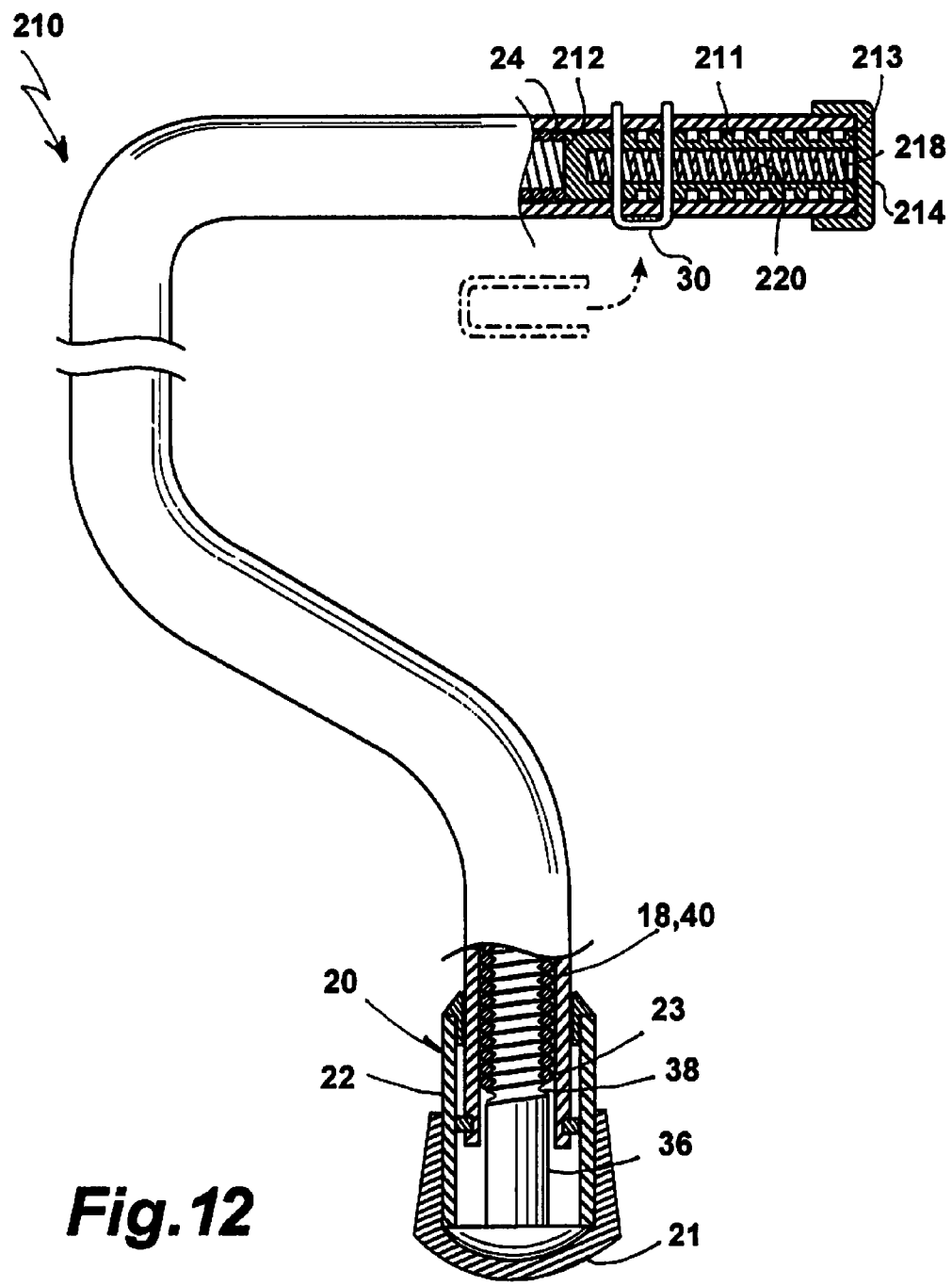
FIG. 12 is a partial cross sectional view taken on line 12-12 in FIGS. 9, 10 and 11 showing the leg of the device in a first unextended position.

Referring now to the figures, in which like numerals indicate like parts, and particularly to FIGS. 1, 7, and 12 disclosed is A universal stabilizer device 17 which constitutes:
 a) at least one coil 18;
 b) a housing 19; and
 c) at least one sleeve 20.
The at least one sleeve 20 constitutes:
 a) a foot 21; and
 b) a collar 22.
The at least one coil 18 is connected to the foot 21 of the at least one sleeve 20. The at least one coil 18 is at least partially enclosed in the housing 19. The collar 22 of the sleeve 20 extends from the foot 21 of the sleeve 20. The collar 22 of the sleeve 20 partially encompasses the housing 19. The at least one coil 18 is incompressible, and the position of the foot 21 is controlled by the position of the at least one coil 18.

This construction facilitates the use of a coil 18 to control a foot 21 for stabilization purposes. This provides a number of advantages. As illustrated in FIGS. 4, 6, 7, and 9-13, this allows the coil to travel through a housing 19 which has a number of bends, while still producing a firm support because of the incompressible coil 18. Additionally, the sleeve 20 construction permits movement of the support for an object without adjusting more visible or exterior components than necessary.

As shown most clearly in FIG. 7, as well as in FIG. 12, the at least one coil 18 has a proximal end 23 and a distal end 24. The proximal end 23 of the at least one coil 18 is connected to the foot 21 of the at least one sleeve 20. The device 17 further constitutes a plunger 25. The distal end 24 of the at least one coil 18 abuts the plunger 25. The plunger 25 is rigid and incompressible, and the plunger 25 is encompassed by the housing 19. This permits the plunger 25 to be a part of the control of the foot 21 without causing extra movement.

The plunger 25 has at least one annular groove 26 therein. The at least one annular groove 26 is for facilitating locking of the plunger 25 in a particular location relative to the housing 19. Further for facilitating same, the housing 19 has a plurality of holes 28 therein. The plurality of holes 28 constitute pairs of holes 28 which face one another so that a pin 30 may travel between them. Thus, the locking of the plunger 25 in a particular location relative to the housing 19 is accomplished by the pin 30 which travels through at least one of the holes 28 of said housing and abuts the at least one annular groove 26 of the plunger 25.

Figure 8:
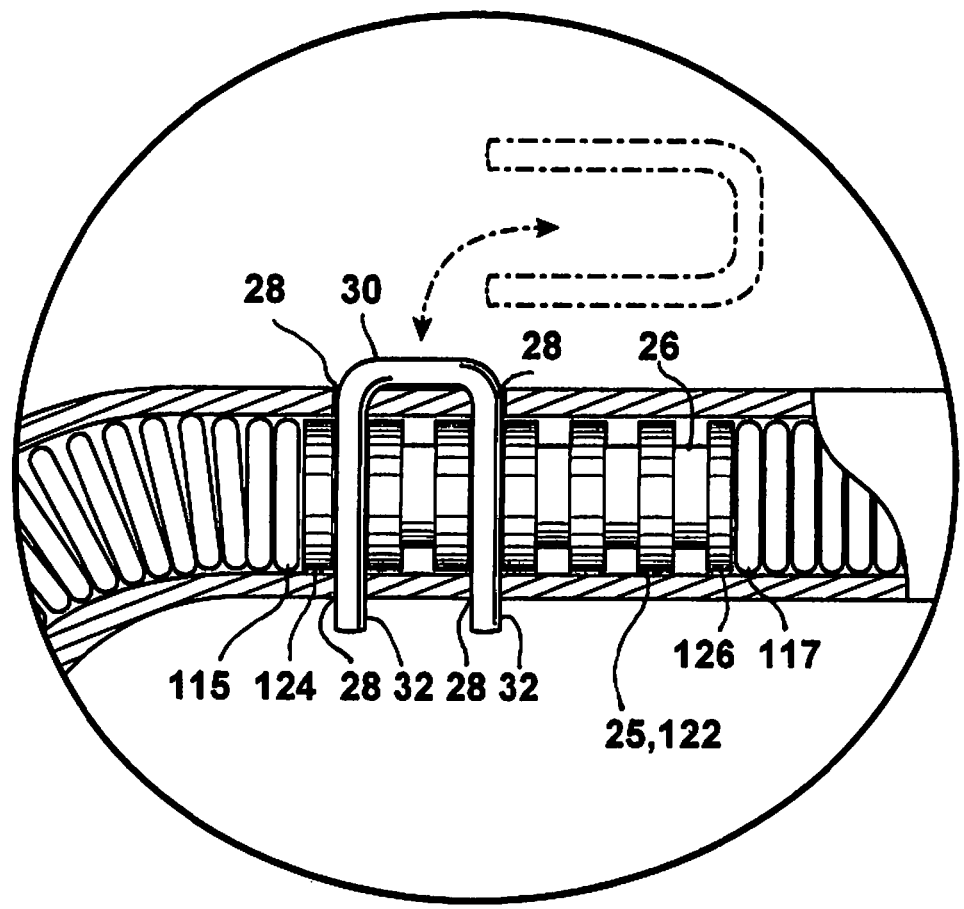
FIG. 8 is an enlarged view of the area enclosed in the dotted circle indicated by arrow 8 in FIG. 7.
Figure 9:
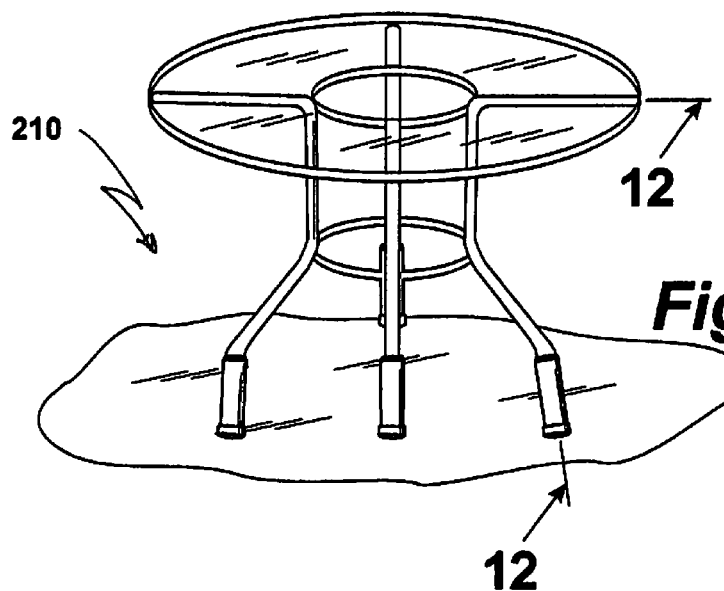
FIG. 9 is a diagrammatic view illustrating a second embodiment of the invention being utilized with another table.
Figure 10:
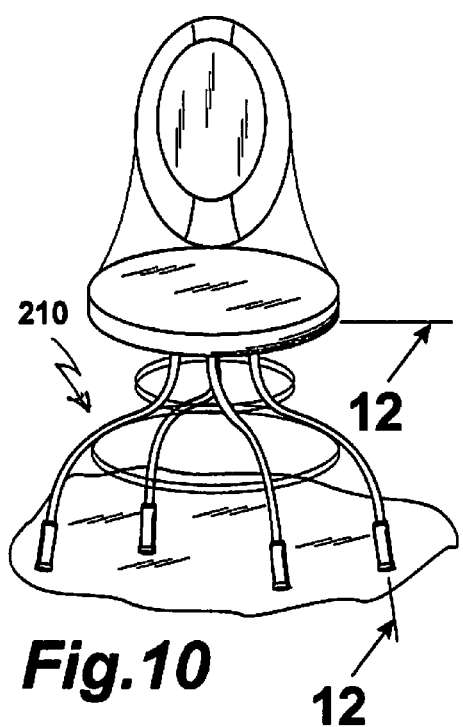
FIG. 10 is a diagrammatic view illustrating a second embodiment of the invention being utilized with vanity chair.
Figure 11:
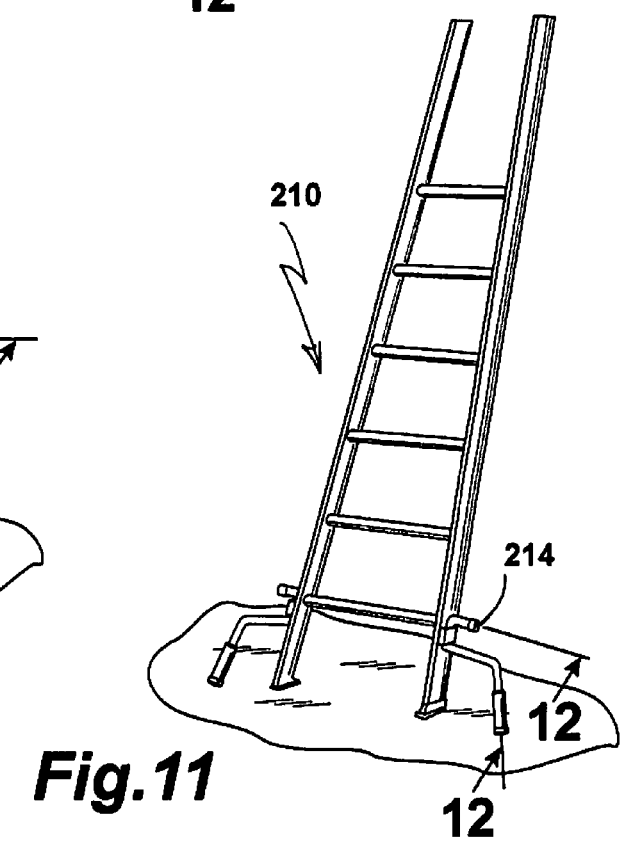
FIG. 11 is a diagrammatic view illustrating a second embodiment of the invention being utilized with ladder.
Figure 13:
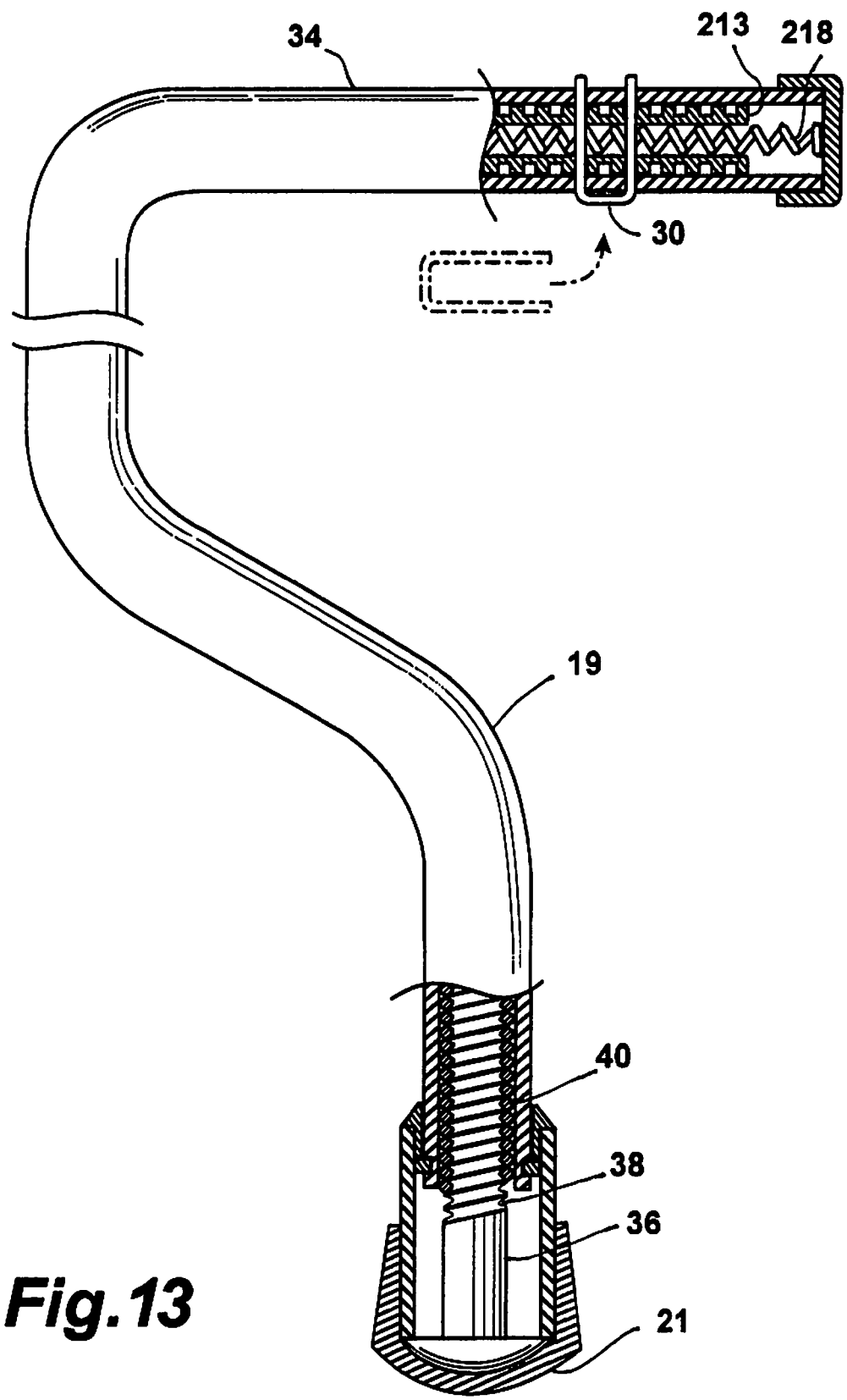
FIG. 13 is a partial cross sectional view taken on line 12-12 in FIGS. 9, 10 and 11 showing the leg of the device in a second extended position.
Figure 14:
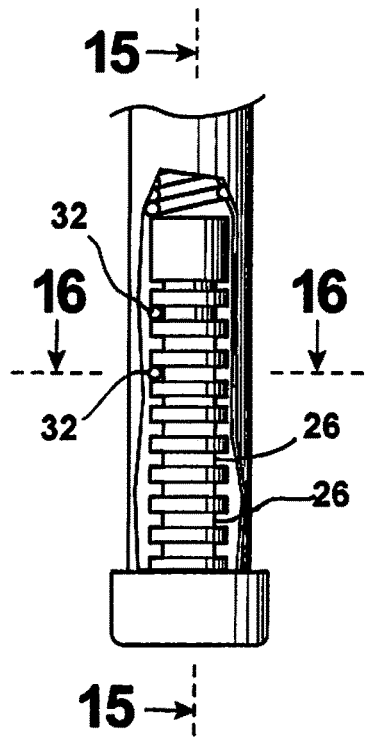
FIG. 14 is diagrammatic perspective view of the locking end of the second embodiment of the device with parts broken away.

In the preferred embodiment, the at least one annular groove 26 constitutes a plurality of annular grooves 26. This allows that the plurality of annular grooves 26 allowing for the locking of the plunger 25 in a particular location relative to the housing 19 to be done in a variety of locations relative to the housing 19. Preferably, and as shown in FIGS. 8, 12, and 13, the pin 30 is a substantially U-shaped pin 30 having two legs 32.

The U-shaped pin 30 having two legs facilitates locking as follows. The plurality of holes 28 constitute at least two pairs of holes 28 which face one another. The at least two pairs of holes 28 which face one another are separated by a distance which corresponds to the distance between the two legs 32 of the substantially U-shaped pin 30. Thus, the two legs 32 of the substantially U-shaped pin 30 go into the at least two pairs of holes 28 for the locking of the plunger 25 in a particular location relative to the housing 19. This configuration requires that the plunger 25 have at least two annular grooves 26 for the legs 32 of the pin 30 to go into.

Further, in the preferred construction of the invention common to all embodiments, the housing 19 has at least one straight portion 34, and the plunger 25 is contained within the straight portion 34 of the housing. This permits the plunger 25 to travel within the straight portion 34 to facilitate controlled motion of the at least one foot 21 for stabilization.

In reference to the controlling of said foot 21, in the preferred structure, the proximal end 23 of the at least one coil 18 is connected to the foot 21 of the at least one sleeve 20 by a rod 36. The rod 36 is at least partially threaded 38. The coil 18 is secured to the rod 36 by threading 40 the coil 18 into the threads 38 of the rod 36.

Description of the First Embodiment 110

The first embodiment 110 of the device 17 is disclosed in FIGS. 1-8. In the first embodiment 110, the at least one coil 18 constitutes a first coil 111 and a second coil 112. The first coil 111 and said second coil 112 each have a proximal end 23 and a distal end 25. Thus, the first coil 111 has a proximal end 114 and a distal end 115. Likewise, the second coil 112 has a proximal end 116 and a distal end 117. The at least one sleeve 20 constitutes a first sleeve 118 and a second sleeve 120. The proximal end 114 of the first coil 111 is connected to the foot 21 of the first sleeve 118. The proximal end 116 of the second coil 112 is connected to the foot 21 of the second sleeve 120.

As in the elements common to all embodiments, the first embodiment of the device 110 further constitutes a plunger 122. The plunger 122 has a first end 124 and a second end 126. The distal end 115 of the first coil 111 abuts the first end 124 of the plunger 122. The plunger 122 is for being selectably locked in a position. The distal end 117 of the second coil 112 abuts the second end 126 of the plunger 122. The plunger 122 is rigid and incompressible. The plunger 122 is encompassed by the housing 19.

This structure allows that the first coil 111, the second coil 112, and the plunger 122 work in unison to move within the housing 19. Thus the first sleeve 118 and the second sleeve 120 and their respective feet 21 move correspondingly, keeping a fixed relative distance because of the incompressibility of the first coil 111, second coil 112, and the plunger 122.

Further, in the first embodiment 110, the housing 19 has a first leg 128 and a second leg 130. The first sleeve 118 constitutes in part a first collar 132. The second sleeve constitutes in part a second collar 134. The first collar 132 is capable of traveling along at least part of the first leg 128 of the housing 19. The second collar 134 is capable of traveling along at least part of the second leg 130 of the housing 19.

Still further, the first leg 128 of the housing 19 has a first stop 136. Likewise, the second leg 130 has a second stop 138. These stops 136, 138 are disposed at the ends of the first leg 128 and second leg 130 respectively. There is a maximum extent to the travel of the first collar 132 along the first leg 128 of the housing 19. Likewise, there is a maximum extent to the travel of the second collar 134 along the second leg 130 of the housing 19. The maximum extent to the travel of the first collar 132 along the first leg 128 of the housing 19 is governed by the first stop 136. The maximum extent to the travel of the second collar 134 along the second leg 130 of the housing 19 is governed by the second stop 138.

Thus, the first collar 132 and the second collar 134 move in unison. The movement in unison is caused by the incompressibility of the first coil 111, the second coil 112, and the plunger 122. The movement in unison causes a weight or object 156 attached to the housing 19 of the device 110 to be self-stabilizing.

Now will be discussed a second variant of the first embodiment of the device 110, shown in FIGS. 1 and 3-6. In this variant the device 110 constitutes a first stabilizer 140 and a second stabilizer 142. The first stabilizer 140 and the second stabilizer 142 are for providing a set of four supports for an object 156.

To facilitate this, the first stabilizer 140 and the second stabilizer 142 have coils 18 and plungers 122 of such lengths that the feet 21 of the first stabilizer 140 and the feet 21 of the second stabilizer 142 all rest on a flat surface at the same time.

The first stabilizer 140 constitutes in part a first foot 144 of the first stabilizer 140 and a second foot 146 of the first stabilizer 140. The second stabilizer 142 constitutes in part a first foot 148 of the second stabilizer and a second foot 150 of the second stabilizer 142.

As illustrated in FIG. 1, The first foot 144 of the first stabilizer 140 and the first foot 148 of the second stabilizer 142 are capable of being placed at a first elevation 152. The second foot 146 of the first stabilizer 140 and the second foot 150 of the second stabilizer 142 are capable of being placed at a second elevation 154 different from the first elevation. Thus, the first stabilizer 140 and the second stabilizer 142 are capable of stabilizing an object connected to them 156 when the first feet 144, 148 are at said first elevation 152 and the second feet 146, 150 are at said second elevation 154.

Description of the Second Embodiment 210

Disclosed now is a second embodiment of the device 210. This embodiment is shown in FIGS. 9-16, and discloses a version of the device 17 with a single, adjustable stabilizer. In the second embodiment 210, a plunger 211 has a proximal end 212 and a distal end 213, and where the proximal end 212 of the plunger 211 abuts the distal end 24 of the coil 18.

The housing 19 further constitutes a cap 214. The cap 214 is at an end 216 of the housing 19 and closes that end 216. The device 210 further contains a spring 218. The spring 218 is for controlling the location of the distal end 213 of the plunger 211 in respect to the cap 214 of the housing 19. This allows that the coil 19 is essentially spring loaded, with the only compressibility being afforded by the spring 218. The plunger 211 preferably has the annular grooves 26 for locking common to both embodiments, allowing that the spring 218 can be used for balancing a load and then locking the foot 21 in place at the desired elevation.

Figure 15:
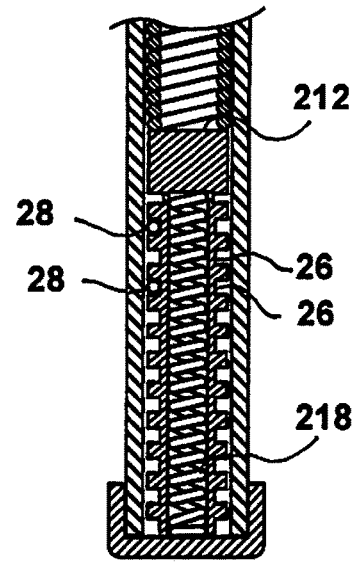
FIG. 15 is a cross sectional view thereof taken on line 15-15 of FIG. 14.
Figure 16:
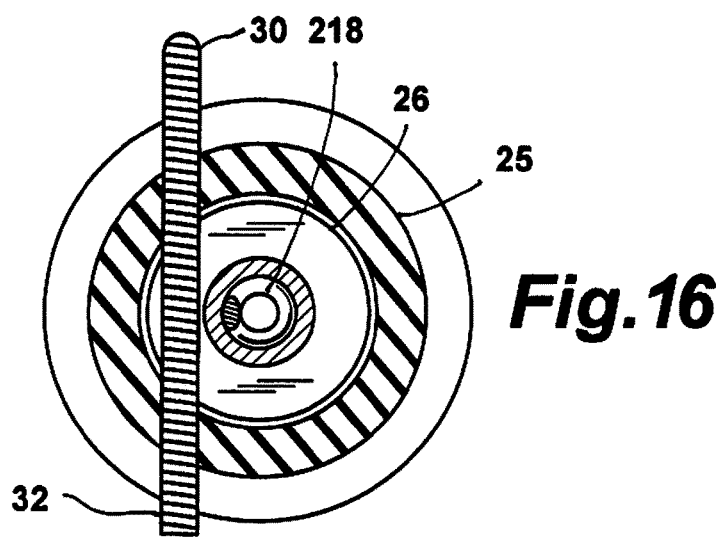
FIG. 16 is a cross sectional view thereof taken on line 16-16 of FIG. 14.

In the preferred construction as illustrated most clearly in FIG. 15, the plunger 211 has a bore 220 therein. The bore 220 of the plunger 211 extends from the distal end 213 of the plunger, but the bore 220 does not reach the proximal end 212 of the plunger 211. The spring 218 is encompassed at least partially in the bore 220 of the plunger 211. The encompassing of the spring 218 in the bore 220 allows the plunger 211 to be flush with the cap 214 when the spring 218 is compressed.

It will be understood that each of the elements described above, or two or more together, may also find a useful application in other types of constructions differing from the types described above.

While the invention has been illustrated and described as embodiments of a UNIVERSAL STABILIZER DEVICE, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A stabilizer device which comprises:
 a) at least one coil;
 b) a housing; and
 c) at least one sleeve;
 wherein said at least one sleeve comprises:
 a) a foot; and b) a collar;
wherein said at least one coil is connected to said foot of said at least one sleeve;
wherein said at least one coil is at least partially enclosed in said housing;
wherein said collar of said sleeve extends from said foot of said sleeve;
wherein said collar of said sleeve partially encompasses said housing;
wherein said at least one coil is incompressible; and
wherein the position of said foot is controlled by the position of said at least one coil;
wherein said at least one coil comprises a first coil and a second coil;
wherein said first coil and said second coil each have a proximal end and a distal end;
wherein said at least one sleeve comprises a first sleeve and a second sleeve;
wherein said proximal end of said first coil is connected to said foot of said first sleeve; and
wherein said proximal end of said second coil is connected to said foot of said second sleeve;
wherein said device further comprises a plunger;
wherein said plunger has a first end and a second end;
wherein said distal end of said first coil abuts said first end of said plunger;
wherein said plunger is for being selectably locked in a position;
wherein said distal end of said second coil abuts said second end of said plunger;
wherein said plunger is rigid and incompressible; and
wherein said plunger is encompassed by said housing;
wherein said housing comprises a first leg and a second leg;
wherein said first sleeve comprises a first collar;
wherein said second sleeve comprises a second collar;
wherein said first collar is capable of traveling along at least part of said first leg of said housing; and
wherein said second collar is capable of traveling along at least part of said second leg of said housing;
wherein said first leg comprises a first stop;
wherein said second leg comprises a second stop;
wherein there is a maximum extent to the travel of said first collar along said first leg of said housing;
wherein there is a maximum extent to the travel of said second collar along said second leg of said housing;
wherein said maximum extent to the travel of said first collar along said first leg of said housing is governed by said first stop; and
wherein said maximum extent to the travel of said second collar along said second leg of said housing is governed by said second stop;
wherein said first collar and said second collar move in unison;
wherein said movement in unison is caused by the incompressibility of said first coil, said second coil, and said plunger; and
wherein said movement in unison causes a weight attached to said housing to be self-stabilizing.

2. The device of claim 1 wherein said device is configured to utilize a first stabilizer and second stabilizer simultaneously; and
wherein said first stabilizer and said second stabilizer are for providing a set of four supports for an object.

3. The device of claim 2 wherein said first stabilizer and said second stabilizer have coils and plungers of such lengths that said feet of said first stabilizer and said feet of said second stabilizer all rest on a flat surface at the same time.

4. The device of claim 3 wherein said first stabilizer comprises a first foot of said first stabilizer and a second foot of said first stabilizer;
wherein said second stabilizer comprises a first foot of said second stabilizer and a second foot of said second stabilizer;
wherein said first foot of said first stabilizer and said first foot of said second stabilizer are capable of being placed at a first elevation;
wherein said second foot of said first stabilizer and said second foot of said second stabilizer are capable of being placed at a second elevation different from said first elevation; and
wherein said first stabilizer and said second stabilizer are capable of stabilizing an object connected to them when said first feet are at said first elevation and said second feet are at said second elevation.

5. The device of claim 1 wherein said plunger has at least one annular groove therein;
wherein said at least one annular groove is for facilitating locking of said plunger in a particular location relative to said housing.

6. The device of claim 5 wherein said housing has a plurality of holes therein;
wherein said plurality of holes comprise pairs of holes which face one another so that a pin may travel between them;
wherein said locking of said plunger in a particular location relative to said housing is accomplished by said pin which travels through at least one of said holes of said housing and abuts said at least one annular groove of said plunger.

7. The device of claim 6 wherein said at least one annular groove comprises a plurality of annular grooves; and
wherein said plurality of annular grooves are for allowing for said locking of said plunger in a particular location relative to said housing to be done in a variety of locations relative to said housing.

8. The device of claim 7 wherein said pin comprises a substantially U-shaped pin having two legs, wherein said plurality of holes comprise at least two pairs of holes which face one another;
wherein said at least two pairs of holes which face one another are separated by a distance which corresponds to the distance between said two legs of said substantially U-shaped pin; and
wherein said two legs of said substantially U-shaped pin go into said at least two pairs of holes for said locking of said plunger in a particular location relative to said housing.

9. The device of claim 8 wherein said housing has at least one straight portion; and
wherein said plunger is contained within said straight portion of said housing.

* * * * *